(12) United States Patent
Ji et al.

(10) Patent No.: US 9,777,896 B2
(45) Date of Patent: Oct. 3, 2017

(54) MULTI-SOURCE HOMEWORK LAMP

(71) Applicant: Boe Technology Group Co., Ltd., Beijing (CN)

(72) Inventors: Chunyan Ji, Beijing (CN); Yanbing Wu, Beijing (CN); Fei Liu, Beijing (CN); Tian Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/769,154

(22) PCT Filed: Apr. 14, 2015

(86) PCT No.: PCT/CN2015/076554
§ 371 (c)(1),
(2) Date: Aug. 20, 2015

(87) PCT Pub. No.: WO2016/065854
PCT Pub. Date: May 6, 2016

(65) Prior Publication Data
US 2016/0334069 A1  Nov. 17, 2016

(30) Foreign Application Priority Data
Oct. 31, 2014 (CN) .......................... 2014 1 0602324

(51) Int. Cl.
*H05B 37/04* (2006.01)
*F21S 6/00* (2006.01)
(Continued)

(52) U.S. Cl.
CPC ................ *F21S 6/003* (2013.01); *F21V 1/10* (2013.01); *F21V 17/02* (2013.01);
(Continued)

(58) Field of Classification Search
CPC ........ F21V 17/00; F21V 21/30; F21V 21/145; F21V 23/04; F21V 33/0052;
(Continued)

(56) References Cited

U.S. PATENT DOCUMENTS

| 8,002,438 B2* | 8/2011 | Ko | ............................ F21V 1/08 362/249.02 |
| 2004/0105264 A1* | 6/2004 | Spero | ....................... B60Q 1/04 362/276 |

(Continued)

FOREIGN PATENT DOCUMENTS

| CN | 101846262 | 9/2010 |
| CN | 101907244 | 12/2010 |

(Continued)

OTHER PUBLICATIONS

Office action from Chinese Application No. 201410602324.2 dated Feb. 1, 2016.
(Continued)

*Primary Examiner* — Tung X Le
(74) *Attorney, Agent, or Firm* — Calfee, Halter & Griswold LLP

(57) ABSTRACT

The disclosure discloses a multi-source homework lamp comprising: a first lampshade and a second lampshade connected to a shaft, wherein the first lampshade and the second lampshade are rotatable around the shaft; main lights disposed inside each of the lampshades; and a control unit for controlling the luminance of the main lights and controlling the rotation of the first lampshade and the second lampshade, thereby controlling the angle between the two. In the multi-source homework lamp according to the disclosure, by a design of the two-piece main lights with the angle being variable, the illuminance is caused to be more uniform, and the illumination range and the illumination (Continued)

luminance of the homework lamp may be adjusted more conveniently.

16 Claims, 2 Drawing Sheets

(51) Int. Cl.
    *F21V 1/10*         (2006.01)
    *F21V 17/02*       (2006.01)
    *H05B 33/08*       (2006.01)
    *H05B 37/02*       (2006.01)
    *F21V 21/14*       (2006.01)
    *F21Y 115/15*      (2016.01)
    *F21V 21/22*       (2006.01)
    *F21V 23/00*       (2015.01)
    *F21V 21/15*       (2006.01)
    *F21Y 115/10*      (2016.01)

(52) U.S. Cl.
    CPC ..... *H05B 33/0896* (2013.01); *H05B 37/0218* (2013.01); *H05B 37/0227* (2013.01); *F21V 21/14* (2013.01); *F21V 21/15* (2013.01); *F21V 21/22* (2013.01); *F21V 23/003* (2013.01); *F21Y 2115/10* (2016.08); *F21Y 2115/15* (2016.08)

(58) Field of Classification Search
    CPC .............. H05B 39/085; H05B 33/0896; H05B 37/0218; H05B 37/0227
    USPC ............................ 362/98, 253, 413; 315/136
    See application file for complete search history.

(56) References Cited

U.S. PATENT DOCUMENTS

| | | | | |
|---|---|---|---|---|
| 2007/0052375 A1* | 3/2007 | Lin | ................... | H05B 33/0818 315/312 |
| 2008/0091250 A1* | 4/2008 | Powell | ................. | A61M 21/00 607/90 |
| 2010/0238644 A1* | 9/2010 | Huang | ................... | F21S 6/003 362/33 |
| 2013/0221853 A1* | 8/2013 | Chang | ................. | H05B 39/085 315/136 |
| 2015/0342006 A1* | 11/2015 | Bosua | ............... | H05B 33/0845 315/153 |

FOREIGN PATENT DOCUMENTS

| | | |
|---|---|---|
| CN | 201715359 | 1/2011 |
| CN | 101963304 | 2/2011 |
| CN | 202747092 | 2/2013 |
| CN | 103426275 | 12/2013 |
| CN | 203446079 | 2/2014 |
| CN | 203500942 | 3/2014 |
| CN | 103807661 | 5/2014 |
| CN | 203671366 | 6/2014 |
| CN | 203686867 | 7/2014 |
| CN | 104295988 | 1/2015 |
| CN | 204083971 | 1/2015 |
| WO | 2012/121126 | 9/2012 |

OTHER PUBLICATIONS

International Search Report and Written Opinion from PCT/CN15/076554 dated Jul. 1, 2015.
Office action from Chinese Application No. 201410602324.2 dated Jun. 28, 2016.

* cited by examiner

MULTI-SOURCE HOMEWORK LAMP

RELATED APPLICATIONS

The present application is the U.S. national phase entry of PCT/CN2015/076554, with an international filing date of Apr. 14, 2015, which claims the benefit of Chinese Patent Application No. 201410602324.2, filed on Oct. 31, 2014, the entire disclosures of which are incorporated herein by reference.

FIELD OF THE INVENTION

The disclosure relates to a lighting device, and in particular, to a multi-source homework lamp.

BACKGROUND OF THE INVENTION

Over the years, many called "eye-shield" homework desk lamps prevail in the market, however, authoritative studies show that over 90% of the eye-protection lamps do not meet the comfortable lighting safety standard, let alone truly protect the vision of students.

The function of many so-called eye-protection desk lamps in the market is complex, requires a user to judge by himself and then manually select, and the randomness is very large. However, for most users, they in fact do not know what lighting condition is the most healthy and the most suitable for them, are tired of complex setting operations, and people immersed in work and study also have no time to attend to desk lamp adjustment. A good lighting tool should be integrated with a user's life, not increase extra burden, or even let a user not feel its existence, and therefore there is a need for taking into account the most scientific and the most healthy elements in the design of a desk lamp for users, and allowing users to achieve fool-typed use.

SUMMARY OF THE INVENTION

With respect to the problems and deficiencies existing in the prior art, the disclosure provides a multi-source homework lamp and thereby improves the illuminance uniformity.

According to an aspect of the disclosure, there is presented a multi-source homework lamp comprising:

a first lampshade and a second lampshade connected to a shaft, wherein the first lampshade and the second lampshade are rotatable around the shaft;

main lights disposed inside each of the lampshades;

a control unit for controlling the rotation of the first lampshade and the second lampshade and/or the luminance of the main light, such that the angle between the two lampshades can be controlled.

In the multi-source homework lamp according to the disclosure, by the two-piece main lights with the angle being variable, the illuminance is caused to be more uniform, and the illumination range and the illumination luminance of the homework lamp may be adjusted more conveniently.

In an embodiment of the multi-source homework lamp according to the disclosure, the multi-source homework lamp may further comprise a sidelight disposed on a side edge of the first and/or second lampshade, and thereby can extend the illumination range and further optimize the illuminance uniformity.

In an embodiment of the multi-source homework lamp according to the disclosure, the main light may be an OLED area light source, and the way of connection between the lampshades and the shaft may employ a hinge joint or any other suitable way of connection which may achieve the rotation.

In an embodiment of the multi-source homework lamp according to the disclosure, the multi-source homework lamp may further comprise: a base and a support, wherein one end of the support is connected to the shaft and the other end is connected to the base. Preferably, the support may be a telescopic support whose height may be adjusted, to facilitate the adjustment of the height of the multi-source homework lamp. What's more, the support may also be rotatable on the base, and thereby can adjust the orientation of the lampshades.

In an embodiment of the multi-source homework lamp according to the disclosure, the lamp may further comprise: a human eye recognition apparatus for sensing a human eye, such as an infrared camera, disposed on the base, wherein the control unit may be configured to cause the main lights and/or the sidelight of the multi-source homework lamp to emit light when the human eye recognition apparatus senses a human eye, and cause the main lights and/or the sidelight of the multi-source homework lamp to stop emitting light when a human eye is not sensed within a predetermined length of time. The human eye recognition apparatus may be preferably disposed on the upper surface of the base, wherein the upper surface of the base is at an oblique angle with respect to its bottom surface to facilitate easier sense of a human eye.

In an embodiment of the multi-source homework lamp according to the disclosure, the human eye recognition apparatus may further be used for determining a blink frequency, and the control unit is configured to reduce the light intensity of the main lights when the determined blink frequency exceeds a preset frequency. In addition, the human eye recognition apparatus may further be used for determining the distance between the human eye and the desktop where the multi-source homework lamp is located based on common sense of mathematics.

In an embodiment of the multi-source homework lamp according to the disclosure, the multi-source homework lamp may further comprise: a warning unit for issuing warning information when the determined distance is less than a predetermined distance.

In an embodiment of the multi-source homework lamp according to the disclosure, the multi-source homework lamp may further comprise a first light sensor disposed on the shaft and for measuring the intensity of ambient light, and the control unit is further configured to control the rotation of the first lampshade and the second lampshade and/or the luminance of the main lights according the measured intensity of ambient light. Additionally, the control unit may be configured to adjust the angle between the lampshades based on the intensity of ambient light. For example, the control unit may be configured to control the rotation of the first lampshade and the second lampshade, such that the angle between the two is between 120° and 180°, when the intensity of ambient light is larger than a threshold. For another example, the control unit is configured to control the rotation of the first lampshade and the second lampshade, such that the two coincide and the main lights of both the first lampshade and the second lampshade face outwards, when the intensity of ambient light is less than the threshold.

In an embodiment of the multi-source homework lamp according to the disclosure, the sidelight may comprise an inner sidelight close to the shaft and/or an outer sidelight away from the shaft and opposite to the inner sidelight, and the control unit may be configured to: control the inner sidelights and the outer sidelights of the first lampshade and the second lampshade to be turned on when the intensity of ambient light is less than the threshold; and control the outer sidelights of the first lampshade and the second lampshade to be turned on and the inner sidelights to be turned off when the intensity of ambient light is larger than the threshold.

In an embodiment of the multi-source homework lamp according to the disclosure, the multi-source homework lamp may further comprise a second light sensor disposed on the first lampshade or the second lampshade and for receiving light reflected from a target object illuminated by the multi-source homework lamp and measuring its illuminance, and the control unit is further configured to adjust the light intensities of the main lights and/or the sidelight according to the illuminance, such that the illuminance reaches a predetermined illuminance.

BRIEF DESCRIPTION OF THE DRAWINGS

The features and advantages of the disclosure will be understood more clearly by referring to the drawings, which are schematic and should not be understood as limiting to the disclosure in any way, and in which.

DETAILED DESCRIPTION OF THE INVENTION

In the following particular implementations of the disclosure will be further described in detail in connection with the drawings and embodiments. The following embodiments are used for illustrating the disclosure, but not for limiting the scope of the disclosure.

Figure 1:
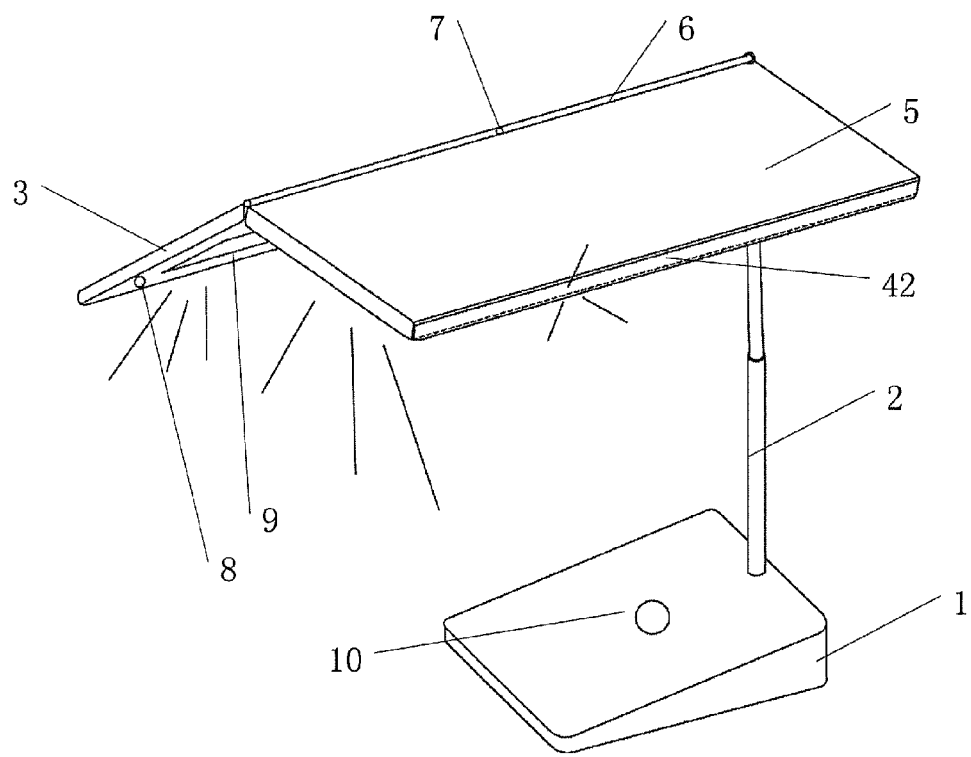
FIG. 1 shows a perspective view of a multi-source homework lamp according to an embodiment of the disclosure.

FIG. 1 shows a perspective view of a multi-source homework lamp according to an embodiment of the disclosure. The multi-source homework lamp as shown in FIG. 1 comprises: a first lampshade 3 and a second lampshade 5 connected to a shaft 6, wherein both the first lampshade 3 and the second lampshade 5 are rotatable around the shaft 6, such that the angle between the two lampshades is variable;

main lights 9 disposed inside the first lampshade 3 and the second lampshade 5; and a control unit (not shown in the figure) for controlling the luminance of the main lights 9 and/or for controlling the rotation of the first lampshade 3 and the second lampshade 5, thereby controlling the angle between the two. For example, the control unit controls the rotation of the shaft 6 via a motor, and the shaft 6 drives the lampshades to rotate.

Figure 3:
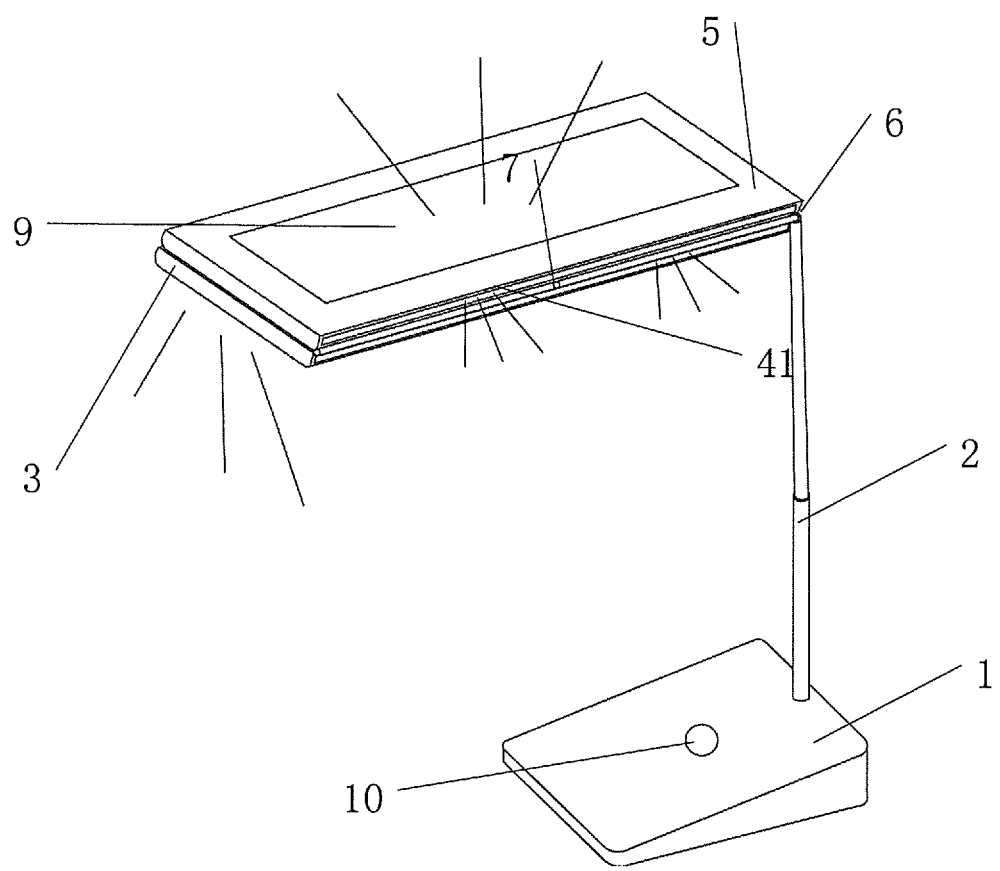
FIG. 3 shows a perspective view of a multi-source homework lamp according to an embodiment of the disclosure, wherein the angle between the first lampshade and the second lampshade is 360°.

Preferably, the multi-source homework lamp according to an embodiment of the disclosure may further comprise a sidelight disposed on a side edge of the first lampshade and/or the second lampshade, for example, an outer sidelight 42 away from the shaft 6 as shown in FIG. 1 and an inner sidelight 41 close to the shaft 6 as described in detail in the following and as shown in FIG. 3.

In the above embodiment according to the disclosure, by the two-piece main lights 9 with the angle being variable and a design with sidelights, the illuminance is caused to be more uniform, and the illumination range and the illumination luminance of the homework lamp may be adjusted more conveniently.

In the multi-source homework lamp according to an embodiment of the disclosure as shown in FIG. 1, the main lights 9 may be any suitable light source, for example, a flicker-free light source such as a DC fluorescent tube, a LED, an OLED, etc. Preferably, an OLED area light source may be employed, since the OLED area light source may be sliced, is light and thin, soft, and with little blu-ray harm. On a surface of the main lights 9 may be further disposed a diffusion plate to further improve the illumination uniformity. The first lampshade 3 and the second lampshade 5 may be made from a light transmitting material. In addition, the way of connection of the first lampshade 3 and the second lampshade 5 with the shaft 6 may employ a hinging way or any other suitable way of connection which may achieve the rotation around the shaft 6.

As shown in FIG. 1, the multi-source homework lamp may further comprise a base 1 and a support 2 for supporting the lamp, wherein one end of the support 2 is connected to the shaft 6 and the other end is connected to the base 1. Preferably, the support 2 may be a telescopic support whose height may be adjusted, and/or the orientation thereof may be rotated on the base 1 so as to drive the lampshades to rotate around the support 2 to facilitate the adjustment of the illumination range.

In the multi-source homework lamp as shown in FIG. 1, a surface of the base 1 may be for example covered with an acrylic layer with a high light transmission (not shown), which facilitates transmission of more infrared light.

As shown in FIG. 1, on the base 1 is disposed an infrared camera 10 as a human eye recognition apparatus, and the way it works is for example as follows: when powered on, the homework lamp enters a standby mode, whereas only when the infrared camera 10 senses the existence of a human eye, the homework lamp will emit light or light. As shown in FIG. 1, for the convenience of sensing a human eye, the upper surface of the base 1 on which the infrared camera 10 is disposed is at an oblique angle with respect to its bottom surface. Of course, in addition to the infrared camera 10, other device may also be employed which can achieve human eye recognition. It should be noted that the infrared camera 10 may also be placed at other position of the multi-source homework lamp, for example, at the support 2, as long as the existence of a human eye or a person can be sensed. However, in general, it is inappropriate for the infrared camera 10 to be placed on the lampshades 3 and 5, since the position of the lampshades 3 and 5 is relatively high, and even higher than an eye and head of a person to obtain a larger lighting range. Then, when a user sits in front of a writing desk, lampshades are relatively high, and for a human eye recognition apparatus such as an infrared camera 10 to sense a human eye, the user may need to slightly raise his head for cooperation, and if a light source of the multi-source homework lamp is in an ON state at this time, a person will be radiated directly by the light source when he looks up, which is harmful to his eyes. However, if the infrared camera 10 is placed on the base 1, the user will not need to deliberately raise his head and his eyes will also not be stimulated by strong light, which is a more humanized design mode.

Further, the infrared camera 10 can not only sense the existence of a person (e.g., an eye), but also accurately sense a more subtle state of a human eye, for example, sense a blink frequency. The blink frequency can usually reflect the state of a person at that time, for example, a too large blink frequency shows that the person is very tired. Therefore, the control unit may adjust the luminance or intensity of the lamp light according to the blink frequency, to facilitate adaptation of the intensity or luminance of the lamp light to the state of the person. The principle lies in that the infrared camera 10 may record saccadic movements, and hence the control unit may compute the blink frequency. From this, the control unit may adjust the light intensity of the main lights 9 to decrease gradually when the blink frequency exceeds a preset frequency determined based on common sense, and restore the normal light intensity when it is less than the preset frequency. In general, a person will blink about 25 times a minute during the normal use of his eyes, about 15 times a minute when reading a book, and therefore the preset frequency may for example be set to be about 30 times of blink a minute. Of course, if human eye information or blink actions can not be detected in a period of time, it shows that the person has already left or slept, and at this time the control unit may close the main lights and the sidelights to save energy.

Figure 2:
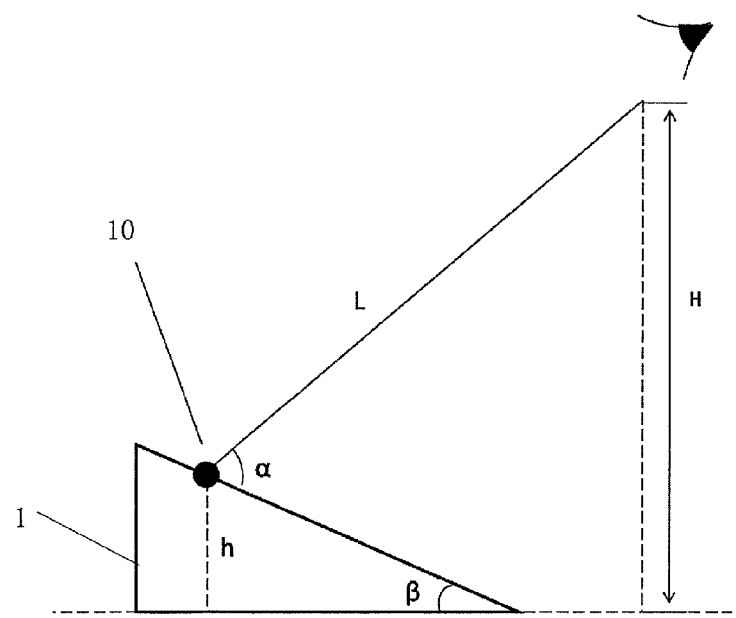
FIG. 2 is geometric schematic diagram of computing the vertical distance from a human eye to a desktop.

Additionally, the infrared camera 10 may further determine the distance between a human eye and a desktop under the multi-source homework lamp. FIG. 2 shows a geometric schematic diagram of computing the vertical distance from a human eye to the desktop. As shown in FIG. 2, when a user is in a normal sitting position, the infrared camera 10 on the base 1 may capture information on the position of a human eye as well as the linear distance L between the human eye and the camera and the angle $\alpha$ between the sight line of the person and the upper surface of the base 1 where the infrared camera 10 is located. In addition, the height h of the infrared camera 10 from the desktop and the angle $\beta$ between the upper surface of the base 1 and the desktop are fixed values, and therefore, according to simple common sense of mathematics, the vertical distance or height from the human eye to the desktop may be computed as: $H=L \sin(\alpha-\beta)+h$. In turn, the data of height is transmitted to the control unit, and the control unit may hereby adjust the height of the telescopic support 2, such that it matches the vertical height H from the human eye to the desktop. The range of height of the support 2 corresponding to the height H of each human eye may be set by experiments. In general, for example, the height of the support may be set to be defined in the range of 40-70 cm for adjustment. For example, when it is detected that the vertical distance H of the user's eye from the desktop is less than 30 cm, the step of adjusting the height of the support may not be performed. Of course, when the height H of the human eye is less than a preset height, a voice reminder or indicator flashes may assist in guiding the user to correct his sitting position.

To intelligently adjust the illumination range and the emission luminance, as shown in FIG. 1, the multi-source homework lamp according to an embodiment of the disclosure further comprises a first light sensor 7 disposed on the shaft 6 for measuring the intensity of ambient light. As such, the control unit may control the angle between the first lampshade 3 and the second lampshade 5 and/or the luminance of the main lights 9 according the intensity of ambient light measured by the first light sensor 7, and a particular control method is for example as follows: when the intensity of ambient light is larger than a threshold (generally 100-200 lx), the control unit controls the angle between the first lampshade 3 and the second lampshade 5 to be between 120° and 180°. In this embodiment, the angle may be automatically adjusted within the range of 120°-180° according to the intensity of ambient light, and the stronger the ambient light, the smaller the angle is, the illumination surface decreases, and of course, the light intensity of the main lights 9 may be reduced appropriately at the same time, to avoid that a too bright environment irritates human eyes. Generally, in a case in which the ambient light is stable and the illuminance reaches the standard, the antiglare performance is better if the angle is stabilized between 150° and 180°.

FIG. 3 shows a perspective view of a multi-source homework lamp according to an embodiment of the disclosure, wherein the angle between the first lampshade 3 and the second lampshade 5 is 360°. As described above, when the intensity of ambient light detected by the first light sensor 7 is lower than the threshold, the control unit may control the multi-source homework lamp to enter a night mode. At this point, the first lampshade 3 and the second lampshade 5 may be folded and coincide, and the main lights 9 of both the first lampshade 3 and the second lampshade 5 face outwards, that is, for example, the second lampshade 5 is automatically flipped to the back of the first lampshade 3, and the angle becomes 360°, as shown in FIG. 3. At this point, it may further be possible to decrease the luminance of the main light 9 of the second lampshade 5 and increase the luminance of the main light 9 of the first lampshade 3. Thus, light emitting upward is provided, and the sidelights may all be turned on, thereby increasing the luminance of the surrounding and upper environments, and guaranteeing that the user can work in an environment with high illumination uniformity and that the sight line moving around will not give rise to discomfort.

In addition, when the intensity of ambient light is less than the threshold and the angle becomes 360°, the control unit may be further used for controlling the inner sidelights 41 as shown in FIG. 3 and the outer sidelights 42 as shown in FIG. 1 to be turned on; and when the intensity of ambient light is larger than the threshold and the angle is between 150° and 180°, the control unit is further used for controlling the outer sidelights 42 to be turned on and the inner sidelights 41 to be turned off. Thus, the light can be distributed uniformly and not be wasted in both modes.

As shown in FIG. 1, the multi-source homework lamp according to an embodiment of the disclosure may further comprise a second light sensor 8 disposed at an appropriate position (e.g., the light emergent side of the main light 9) of the first lampshade 3 or the second lampshade 5 and for receiving light reflected from an object on the desktop and measuring its illuminance. The control unit is further used for adjusting the light intensities of the main lights 9 according to the illuminance measured by the second light sensor 8, such that the illuminance reaches a predetermined illuminance. What is controlled by a prior art dimming system is light intensity, but not illuminance, and illuminance is directly proportional to light intensity and inversely proportional to the square of the distance from the light source to the desktop. For a homework desk lamp, the light intensity is not a primary consideration, but the illuminance is one of the most important evaluation factors. The disclosure aims at providing a constant illuminance that conforms to human eye health. As shown in FIG. 1, the second light sensor 8 may be placed at the leading edge of the lampshade with its light receiving surface being downward, receive reflected light from the desktop or a book and thereby measure the illuminance. Therein, the so-called illuminance is the intensity of illumination, generally refers to the energy of visible light received per unit area, and its unit is lux or lx. The illuminance on a surface illuminated by light is defined as the luminous flux illuminating on a unit area. Suppose that the luminous flux on a surface element dS is $d\Phi$, then the illuminance E on this surface element is $E=d\Phi/dS$. The illuminance is not necessarily equal to reflected light intensity, however in an environment of the homework lamp, what is really received by a human eye is the illumination intensity of reflected light, so testing the illumination intensity of received light reflected from an object on the desktop and performing a measurement still has a simple and practical significance, and hence here this is taken as an index indicating the illuminance. Such a design takes into account the light source itself and the effect of the environment together, and reflects the real illuminance received by the user, without the need for taking into account the ambient light and the fixture itself. In general, the light sensor 8 is not suitable for being placed on the base 1, since if the light sensor 8 were placed on the base 1, the reflection factor of the homework surface was not considered, but a reflected glare would be easily incurred in a case of the reflectivity of the material of the homework surface being too high, thereby resulting that the illuminance measured by the light sensor was inaccurate. The above-mentioned predetermined illuminance adopts an illuminance well known in the art and suitable for a human to best view a target object. In general, where some people have darker and smaller puplis, the illuminance required for reading/writing work is higher, and 500-600lx is the best in the desktop center lighting area.

It should be understood that in embodiments of the disclosure, the control unit may comprise various hardware and software, the hardware is for example a CPU, PLC, SCM, memory device, switch device, logic circuit, etc., and this will not be defined by the disclosure. The control unit may be an integrated unit, or also may comprise individual discrete units. Other devices may have a signal contact with the control unit, and when other devices implement their functions, it may be done via the control unit, or also may be done independent of the control unit. In addition, the control unit may be disposed in the base 1 to reduce the thickness of the lampshade. Of course, it is also possible to be disposed at other position, as long as the control function can be realized.

The above-described implementations are only used for illustrating the disclosure, and not a limitation to the disclosure. Various changes and variations may further be made by those of ordinary skills in the relevant art without departing from the spirit and scope of the disclosure. Therefore, all equivalent solutions also pertain to the category of the disclosure, and the patent protection scope of the disclosure should be defined by the claims.

What is claimed is:

1. A multi-source homework lamp, comprising:
 a first lampshade and a second lampshade connected to a shaft, wherein the first lampshade and the second lampshade are rotatable around the shaft;
 main lights disposed inside each of the first and second lampshades, each of the main lights having an adjustable light intensity;
 a control unit for controlling at least one of the rotation of the first and second lampshades and the adjustable light intensity of the main lights;
 a sidelight disposed on a side edge of at least one of the first lampshade and the second lampshade; and
 a human eye recognition apparatus for sensing a human eye;
 wherein the control unit is further configured to cause at least one of the main lights and the sidelight of the multi-source homework lamp to emit light when the human eye recognition apparatus senses the human eye; and
 wherein the control unit is further configured to cause at least one of the main lights and the sidelight of the multi-source homework lamp to stop emitting light when the human eye is not sensed after a predetermined length of time.

2. The multi-source homework lamp according to claim 1, wherein the first lampshade and the second lampshade are connected to the shaft by hinge joints.

3. The multi-source homework lamp according to claim 1, wherein the main lights are OLED area light sources.

4. The multi-source homework lamp according to claim 1, further comprising:
 a base; and
 a support;
 wherein the human eye recognition apparatus being disposed on the base; and
 wherein a first end of the support is connected to the shaft and a second end of the support is connected to the base.

5. The multi-source homework lamp according to claim 4, wherein the support is a telescopic support with an adjustable height.

6. The multi-source homework lamp according to claim 4, wherein the support is rotatable on the base.

7. The multi-source homework lamp according to claim 4, wherein the human eye recognition apparatus is disposed on an upper surface of the base, and the upper surface of the base is at an angle with respect to a bottom surface of the base.

8. The multi-source homework lamp according to claim 1, wherein the human eye recognition apparatus is further used for determining a blink frequency, and wherein the control unit is configured to reduce the adjustable light intensity of the main lights when the blink frequency exceeds a predetermined frequency.

9. The multi-source homework lamp according to claim 1, wherein the human eye recognition apparatus is further used for determining a distance between the human eye and a desktop upon which the multi-source homework lamp is located.

10. The multi-source homework lamp according to claim 9, wherein the control unit is further configured to adjust the adjustable height of the telescopic support according to the distance between the human eye and the desktop.

11. The multi-source homework lamp according to claim 9, comprising a warning unit for communicating warning information when the distance between the human eye and the desktop is less than a predetermined distance.

12. A multi-source homework lamp comprising:
 a first lampshade and a second lampshade connected to a shaft, wherein the first lampshade and the second lampshade are rotatable around the shaft;
 main lights disposed inside each of the first and second lampshades, each of the main lights having an adjustable light intensity;
 a sidelight disposed on a side edge of at least one of the first lampshade and the second lampshade;
 a control unit for controlling at least one of the rotation of the first and second lampshades and the adjustable light intensity of the main lights; and
 a first light sensor disposed on the shaft for measuring an ambient light intensity;
 wherein the control unit is further configured to control at least one of the rotation of the first and second lampshades and the adjustable light intensity of the main lights according to the ambient light intensity.

13. The multi-source homework lamp according to claim 12, wherein the control unit is further configured to control the rotation of the first lampshade and the second lampshade when the ambient light intensity is larger than a predetermined threshold, such that an angle between the first lampshade and the second lampshade is between 120° and 180°.

14. The multi-source homework lamp according to claim 12, characterized in that, the control unit is configured further to control the rotation of the first lampshade and the second lampshade when the ambient light intensity is less than the predetermined threshold, such that the first lampshade is proximate the second lampshade and the main lights of both the first lampshade and the second lampshade face outwards.

15. The multi-source homework lamp according to claim 12,
wherein the sidelight comprises at least one of an inner sidelight proximate the shaft and an outer sidelight distal the shaft and opposite to the inner sidelight; and
wherein the control unit is configured to:
control the inner sidelights and the outer sidelights of the first lampshade and the second lampshade to be turned on when the ambient light intensity is less than the predetermined threshold; and
control the outer sidelights of the first lampshade and the second lampshade to be turned on and the inner sidelights of the first lampshade and the second lampshade to be turned off when the ambient light intensity is greater than the threshold.

16. The multi-source homework lamp according to claim 12, further comprising:
a second light sensor for receiving light reflected from a target object illuminated by the multi-source homework lamp and measuring a target object illuminance, the second light sensor being disposed on at least one of the first lampshade and the second lampshade;
wherein the control unit is further configured to adjust an adjustable light intensity of at least one of the main lights and the sidelights according to the target object illuminance, such that the target object illuminance reaches a desired target object illuminance.

* * * * *